United States Patent [19]

Le Devehat

[11] Patent Number: 4,998,560

[45] Date of Patent: Mar. 12, 1991

[54] FLUID LOADING ARM EMERGENCY DISCONNECTION SYSTEM

[75] Inventor: Eugene Le Devehat, Saligny, France

[73] Assignee: FMC Corporation, Chicago, Ill.

[21] Appl. No.: 549,655

[22] Filed: Jul. 9, 1990

Related U.S. Application Data

[63] Continuation of Ser. No. 433,878, Nov. 9, 1989, abandoned.

[30] Foreign Application Priority Data

Nov. 9, 1988 [FR] France ............... 88 14646

[51] Int. Cl.⁵ .................................. A16L 3/00
[52] U.S. Cl. ................................ 137/616; 137/615; 141/387
[58] Field of Search .................... 137/614.05, 615, 616, 137/616.5; 141/279, 387, 388

[56] References Cited

U.S. PATENT DOCUMENTS

| | | | |
|---|---|---|---|
| 3,099,297 | 7/1963 | Knight | 137/616.5 X |
| 3,847,413 | 11/1974 | Gurley et al. | 285/316 |
| 4,323,975 | 4/1982 | Ball | 141/387 X |
| 4,354,522 | 10/1982 | Bomioli | 141/387 X |
| 4,408,943 | 10/1983 | McTamaney et al. | 414/138 |
| 4,416,306 | 11/1983 | Le Devehat | 137/615 |
| 4,483,359 | 11/1984 | Robertson | 137/616 X |

FOREIGN PATENT DOCUMENTS 2717135 10/1978 Fed. Rep. of Germany .
WO84/02171 6/1984 PCT Int'l Appl. .

Primary Examiner—John C. Fox
Attorney, Agent, or Firm—W. William Ritt, Jr.; Richard B. Megley

[57] ABSTRACT

A fluid loading arm emergency disconnection system comprising two pipe elements each including a normally closed valve that can be opened when said pipe elements are connected, means for sensing a connection between the arm and a receptacle, means for sensing a predetermined angular arm configuration, and means for disconnecting the arm when the connection and predetermined arm configuration are sensed simultaneously.

7 Claims, 3 Drawing Sheets

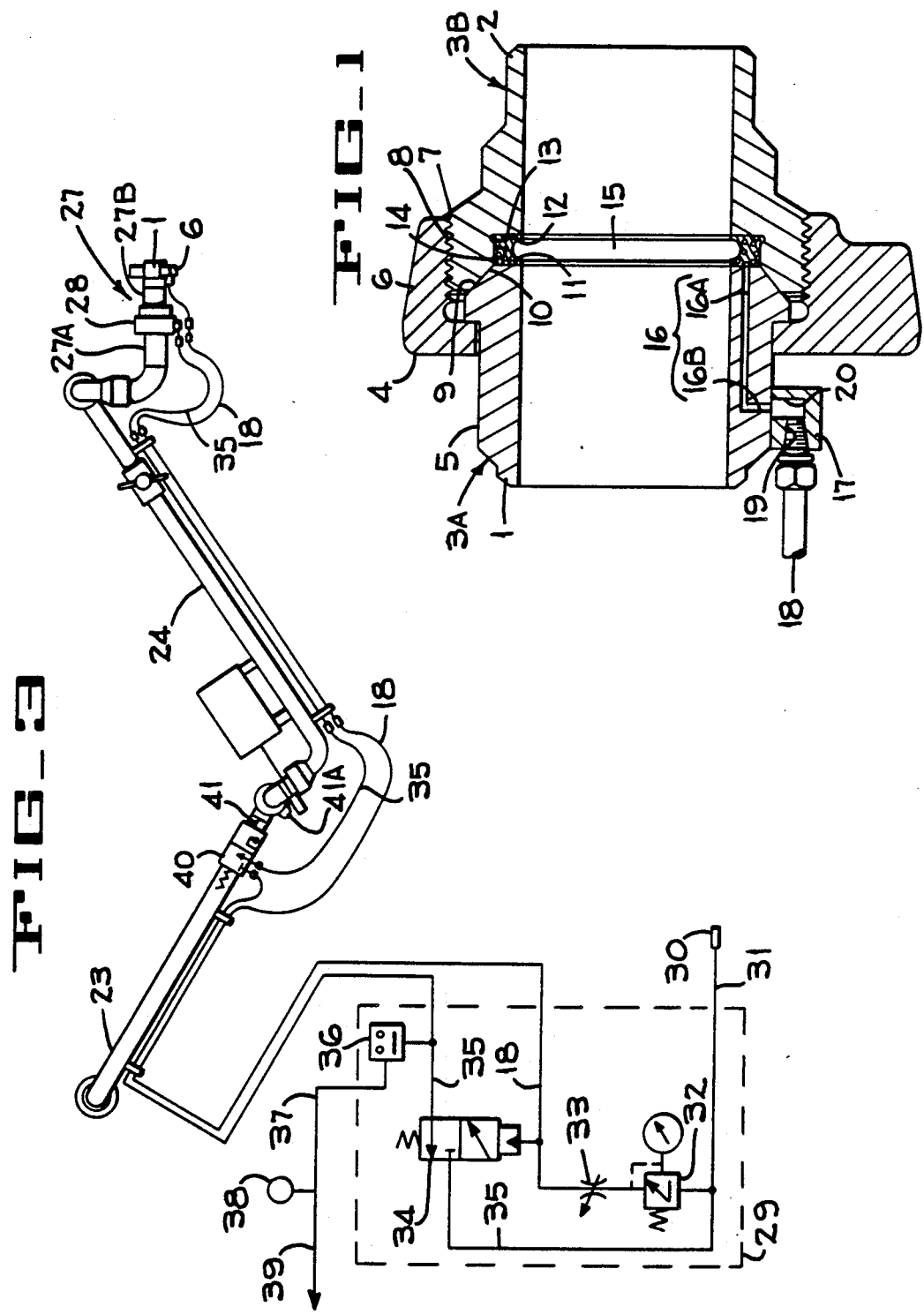

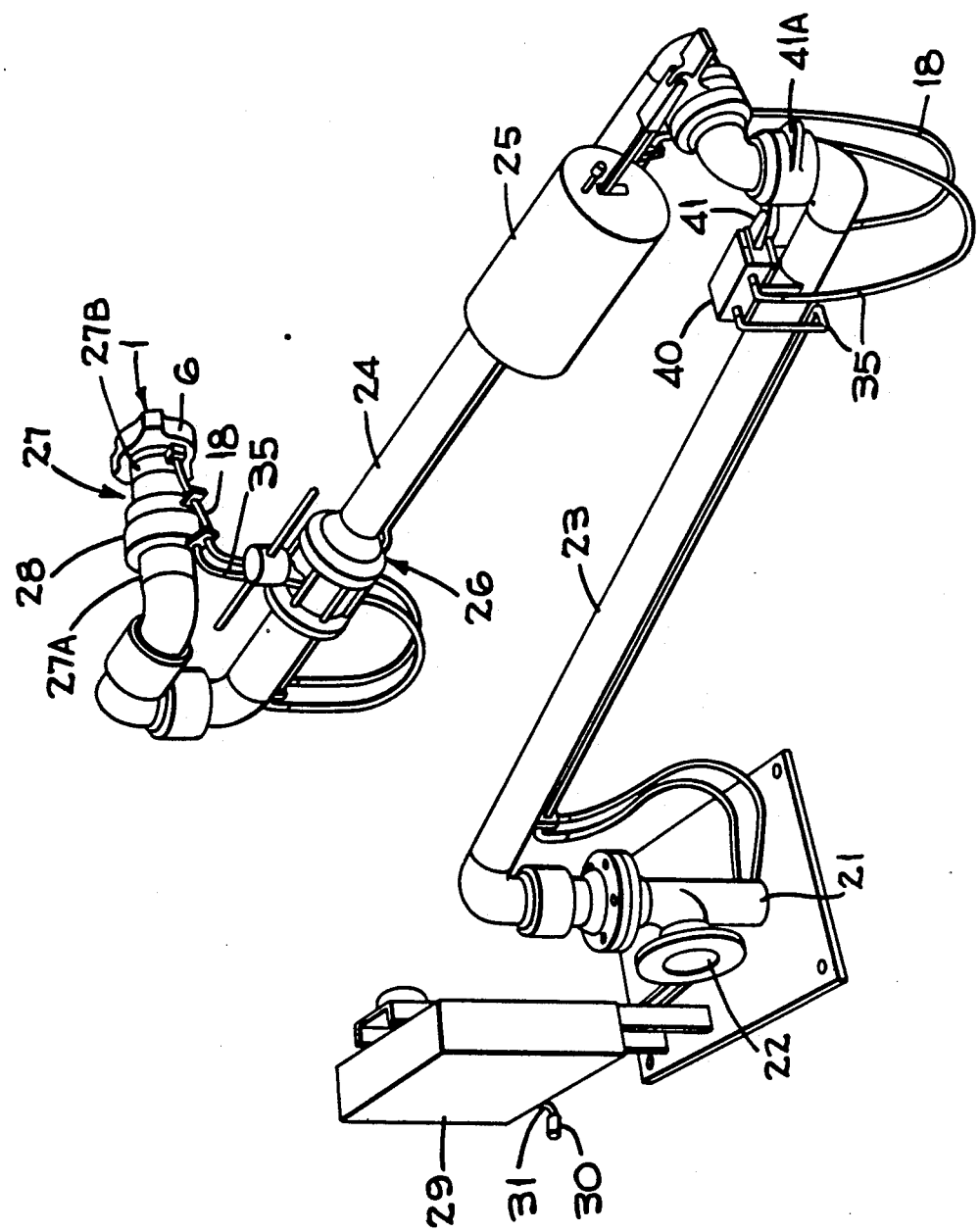
FIG_2

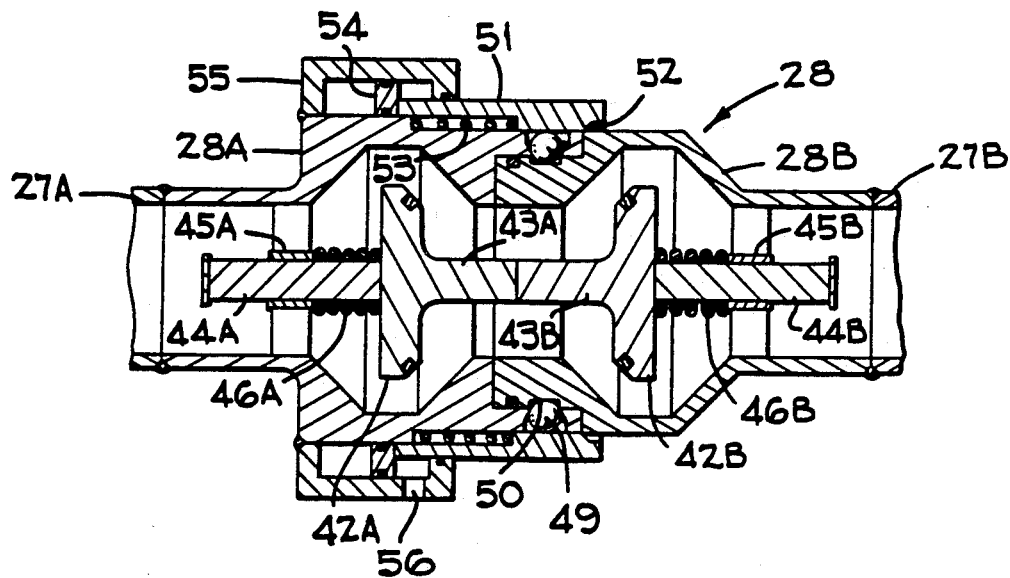
FIG_4
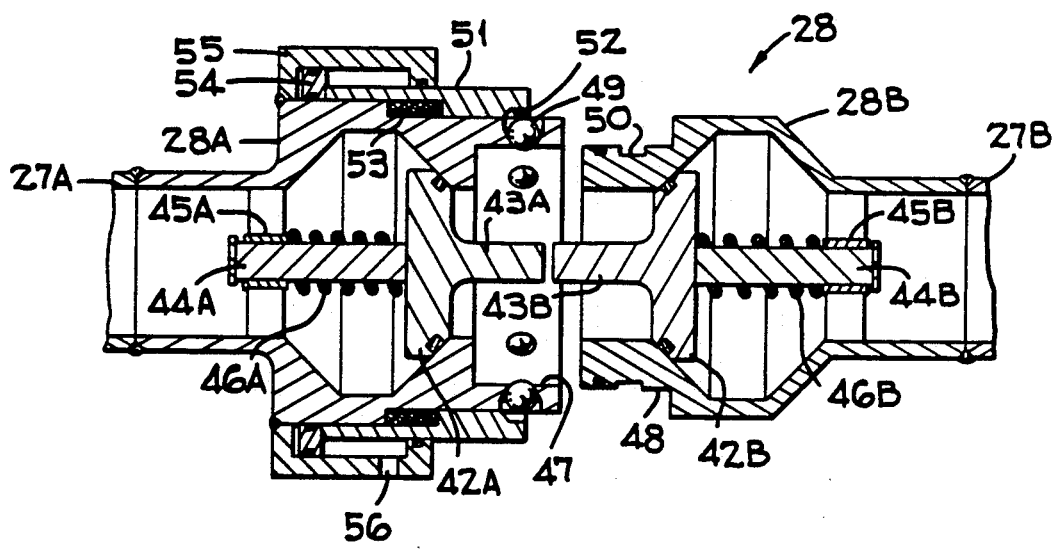
FIG_5

FLUID LOADING ARM EMERGENCY DISCONNECTION SYSTEM

This application is a continuation of application Ser. No. 433,878, filed Nov. 9, 1989, now abandoned.

BACKGROUND OF THE INVENTION

The invention relates to fluid loading arm control systems, and more particularly to systems for disconnecting a fluid loading arm from a tank where the latter and/or the arm is carried by a vehicle, such as a road or railroad vehicle, in the event of untimely departure of the vehicle.

For the above purpose it is known to provide the loading arm with a safety disconnector at its downstream end, i.e. the end that connects to the tank, the safety disconnector comprising two pipe elements each fitted with a valve that is normally in the closed position and that moves to its open position when said pipe elements are connected. The pipe elements are locked together by mechanical means adapted to give way at a predetermined load so that it is at this location that the loading arm and the tank disconnect in the event of the vehicle moving off with the tank still connected to the arm.

This solution is fairly satisfactory as it makes it possible to keep the arm and the tank closed after their separation, thanks to the valves. Nevertheless, it imposes some strain on the arm which may be very highly loaded before the safety disconnector gives way.

The present invention is directed to alleviating this disadvantage.

SUMMARY OF THE INVENTION

Broadly considered, the present invention comprises a method and apparatus for disconnecting a fluid loading arm and a tank, where the arm or the tank is carried by a vehicle, in the event of untimely departure of the vehicle. The loading arm includes a safety disconnector comprising two pipe elements each fitted with a valve normally in the closed position and movable to an open position when said pipe elements are connected, so that when both (1) a connection between the loading arm and tank and (2) a predetermined configuration of the arm are sensed at the same time, both pipe elements of the safety disconnector are unlocked.

In another aspect the invention comprises a fluid loading arm, adapted to be connected to a tank where the arm or the tank is carried by a vehicle, comprising a safety disconnector for disconnecting the arm and the tank in the event of untimely departure of the vehicle, the disconnector comprising two pipe elements each fitted with a valve, means for sensing a connection between the loading arm and the tank, means for sensing a predetermined configuration of the loading arm, means for unlocking said safety disconnector, and means for actuating said unlocking means if said sensing means simultaneously senses said connection and said predetermined configuration.

The aforesaid predetermined configuration corresponds to a configuration that the arm assumes in the event of untimely departure of the vehicle. Therefore, only if the arm is connected can unlocking of the safety disconnector be commanded: this makes it possible to avoid untimely unlocking when the arm is maneuvered to move it towards the tank, in other words before the arm and tank are connected.

In another form the invention comprises a safety disconnector including two pipe elements each fitted with a valve in a normally closed position and moving to an open position when said pipe elements are connected, and further including an unlocking sleeve slidably positioned on one of the safety pipe elements, a spring holding the sleeve in the locked position, and a pneumatic or hydraulic annular piston-and-cylinder actuator surrounding said pipe element and, comprising a piston fastened to the sleeve and operating in the direction opposite to the spring. This annular actuator is particularly advantageous because it minimises the volume occupied externally of the disconnector for the control system thereby making it possible to avoid the inconvenience and the sensitiveness to impact that a control device such as a linear cylinder might occasion.

The characteristics and advantages of the invention will be apparent from the following description of one specific embodiment given hereinafter by way of non-limiting example with the reference to the appended drawings.

BRIEF DESCRIPTION OF THE DRAWINGS

FIG. 1 is a central axial section through a pipe connector for sensing if the connector is made up.

FIG. 2 is a perspective view of a fluid loading arm in accordance with the invention.

FIG. 3 is a plan view of the arm of FIG. 2 in another configuration, including a schematic representation of certain pneumatic components with which it is fitted.

FIGS. 4 and 5 are views in central axial section showing, respectively, in connected and disconnected positions, a safety disconnector with which the arm from FIGS. 2 and 3 is fitted.

DESCRIPTION OF THE PREFERRED EMBODIMENT

The pipe connector shown in FIG. 1 comprises two pipe elements 1 and 2 each adapted to be welded at their respective ends 3A and 3B to the end of one of the pipes (not shown) to be connected.

The pipe element 2 has an annular radial surface 5A that provides a shoulder near the inner end of the elements outer surface 5 for retaining thereon a clamping ring 6 that rotatably surrounds the element 1. The ring 6 has a threaded bore 7 with a diameter corresponding to the threaded surface 8 at the inner end of the pipe element 2, this end also having a female frustoconical surface 9 adapted to fit with a male frustoconical surface 20 at the inner end of the pipe element 1. The inner end of the pipe element 1 terminates at a transverse (radial) annular surface 11, and the pipe element 2 has a similar radial surface 12 an annular groove 13, and a cylindrical bore 24 that form an annular chamber for an annular seal 15. The seal 15 has a cylindrical surface at the end of which is an annular bead, this surface and this bead respectively having dimensions similar to those of the bore 14 and of the groove 13, the inside diameter of the seal 15 being similar to that of the pipe elements 1, 2.

The seal 15 is positioned in the pipe element 2 by pushing it inwards so that the seal is compressed in the area including the bead which slides along the bore 14 and eventually is inserted into the groove 13, the seal then expanding into the position shown where it is henceforth trapped in the pipe element 2.

The pipe elements 1 and 2 are connected by being placed end-to-end so that the surfaces 9 and 10 face each other, engaging the threaded bore 7 of the ring 6 with the surface 8 of the pipe element 2, and then tightening down the ring until it locks. The surfaces 9 and 10 cooperate to assure mutual centering of the pipe elements, and when fully tightened the seal is compressed between the surfaces 11 and 12 so that it can provide a fluid-tight barrier between the pipe elements 1 and 2 when the connection is made as shown in FIG. 1.

The pipe element 1 has a passage 16, comprising a longitudinal portion 16A and a radial portion 16B, extending between the surface 11, in other words from an area in contact with the seal 15 when the pipe elements are connected, and the exterior of the pipe element 1, to be more precise the surface 5. A connection lug 17, in communication with the passage 16B, and a pneumatic tube 18 threaded into a connecting bore 19 in the lug 17, affords a means to connect a pneumatic system to the passage 16.

The connector as shown in FIG. 1 makes it possible to implement the method in accordance with the invention for sensing a connection between two pipes to which the pipe elements 2, 1 are attached. When the passage 16B is connected to a source of pneumatic pressure through the tube 18, and pressure in the tube is sensed, if the pipe elements 1 and 2 are not connected the air from the source of pneumatic pressure can escape through the passage 16A and past the surface 11 so that there is then little or no pressure in the tube., whereas, when the pipe elements 1, 2 are properly connected as shown in FIG. 1, the passage 16A is blocked by the seal 15, the pressure in the tube 18 is maintained, and the connection is verified by sensing the presence of the pressure in the tube 18.

It will be noted that the location of the bore 19 on the connecting lug 17 means that the connection between the tube 18 and the lug does not impede manipulation of the ring 6, and minimises the risk of this connection being struck by a mallet when tightening or loosening that ring.

It will also be seen that the passage in the connecting lug 17 is extended beyond the bore 19 by a bore 20 of larger diameter than the passage 16B in the pipe element 1, to facilitate fitting the lug 17 to the pipe element 1, for example by welding, by reducing the tolerances that have to be complied with.

More generally, the passages 16A, 16B in the pipe element 1 are of smaller diameter than the tube 18 so that it is possible to introduce a head loss limiting the leakage of air through the passages 16A, 16B when the connector is not connected.

It is also beneficial to provide the passages 16A, 16B in the pipe element 1 rather than in the pipe element 2, as this avoids partial obstruction of the passage by the seal 15 in the disconnected state, which would make it impossible to achieve a clear difference of pressure between the connected and disconnected states.

Given the standard with which it complikes, the connector shown in FIG. 1 is suited to providing a quick, temporary connection between two pipes, and in particular between a fluid loading arm such as that shown in FIGS. 2 and 3, and a pipe discharging into a tank carried by a vehicle.

The loading arm shown in FIGS. 2 and 3 is of a well-known type, comprising an arm base 21 provided with an inlet 22, a first segment 23 articulated to the arm base, a second segment 24 articulated to the first segment and equipped with a balancing spring in a spring housing 25 and a loading valve 26, and a third segment 27 articulated to the second segment and equipped with a safety disconnector 28 and ending at the pipe element 12.

The pipe element 1 forms part of a connection sensing device fitted to the arm and which further comprises the tube 18 which runs along the arm to an equipment cabinet 29 near the arm base, which cabinet houses means for connecting the tube 18 to a source of pneumatic pressure and a sensor responsive to the pressure in the tube, the cabinet 29 is provided with a pipe connection 30 for connecting it to a source of pneumatic pressure situated at the end of a fluid line 31 to which the tube 18 is connected via a pressure reducer 32 (FIG. 3), and a variable restriction 33 to limit the size of the compressed air leakage through the pipe element 1 when it is disconnected.

It will be noted that the pressure reducer 32 would not be able to function effectively without the restriction 33 which makes it possible to achieve some pressure at the outlet from the reducer 32 even if the pipe element 1 is disconnected. Of course, downstream of the restriction 33 there is little or no pressure in the tube 18 if the pipe element 1 is disconnected, whereas in the converse case the pressure in this tube is substantially equal to the pressure at the output side of the reducer 32.

The sensor responding to the pressure in the tube 18 is, in this instance, the pneumatic control system of the distributor 34, which is directly connected to it. When the pressure in the tube 18 is zero or low the distributor 34 is in the idle position, and beyond a predetermined threshold corresponding to a pressure that can only be achieved if the passage 16 in the pipe element 1 is blocked the distributor 34 is in the active position. To be more precise, the distributor 34 is idle when the arm is not connected, otherwise it is in the active condition. The distributor is included in a fluid line 35 connected to the fluid line 31, in other words to the source of pneumatic pressure. In the idle position shown in FIG. 3, the distributor 34 blocks the fluid line 35 on the upstream side whereas on the downstream side it vents it to the exhaust, and it is open in the active position. Downstream of the distributor 34 the fluid line 35 is vented to the atmosphere when the arm is disconnected and pressurised when it is connected.

The sensor corresponding to the pneumatic control system of the distributor 34 also provides, in an indirect way, an electrical signal by means of a pressure-sensitive switch 36 that is connected to the fluid line 35 downstream of the distributor 34 and that translates the pneumatic signal provided on the downstream side of the distributor 34 (presence or absence of pressure) into an electrical signal fed to the cable 37: relative to the pressure-sensitive switch 36, the distributor 34 serves simply as a relay.

As an alterative to the above system, a sufficiently sensitive pressure-sensitive switch could be directly connected to the tube 18 and then serve directly as a sensor for the pressure in the tube 18.

The signal supplied by the sensor is exploited according to the wishes and needs of the user. Here the sensing device is fitted to the loading arm to avoid the hazards and problems resulting from pressurisation of the end of the arm when the connection is not made or is not made correctly, which would be possible with prior art amrs not incorporating sensing means.

The electrical version of the connection signal available on the cable 37 is used to switch on a lamp 38 visible to the arm operator who must not open the loading valve 26 unless the lamp is on. The electrical version is also used by means for supplying the arm with fluid (not shown, but to which the line 37 would be connected as symbolically represented by the arrow 39) so that they do not apply pressure to the arm unless it is connected correctly to a tank or other container.

The sensing device is also used to attempt to prevent untimely departure of the vehicle carrying the tank with the latter still connected to the arm: the lam 38 or a similar lamp is placed in the field of view of the vehicle's driver to tell him that his vehicle is connected up, in other words warning him from maneuvering the vehicle in any way.

In accordance with the present invention, the pneumatic version of the sensing signal available in the fluid line 35 downstream of the distributor 34 is used to enable emergency disconnection of the loading arm from the tank in the event that the vehicle carrying the tank moves off at the wrong time.

According to a preferred embodiment of the invention, the disconnector 28 comprises pneumatic means for unlocking the safety connector pipe elements 1, 2. These means are connected to the fluid line 35 which is extended beyond the point of connection to the pressure-sensitive switch 36 to exit the cabinet 29 and run along the segment 23 and through the mechanically controlled distributor 40 at the end of this segment near its articulation to the segment 24, and then running along the segment 24 before terminating at the unlocking means of the disconnector 28.

In the idle position (FIG. 3), the distributor 40 shuts off the fluid line 35 in the upstream direction and vents it to the exhaust in the downstream direction, whereas it is open in the active position. The change from the idle position to the active position is mechanically controlled in response to a predetermined configuration of the arm, in this case the opening of the articulation between the segments 23 and 24 to 180 degrees, in which configuration the plunger 42 attached to the slide-valve of the distributor 40 comes into contact with the cam 41A carried by the segment 245 and changes the position of the distributor 40.

There are, therefore, a first distributor 34 and a second distributor 40 in series on the fluid line 35, means for opening the first distributor 34 in response to the pressure in the tube 18, and means for opening the second distributor 40 in response to a predetermined configuration of the loading arm.

To energise the means for unlocking the disconnector 28 it is therefore necessary for each of the two distributors 34 and 40 to be in the active position; in other words, the connector pipe element 1 must be connected correctly to the connector pipe element 2, and at the same time the arm must be in the abovementioned predetermined configuration which the arm assumes if the vehicle carrying the tank moves off the arm still connected to it. In this case the safety disconnector is unlocked immediately to make it possible to avoid damage, which the arm would sustain with the aforementioned prior art disconnectors, because of the high mechanical loads to which it would be exposed before the mechanical locking means gave way.

It will be noted that the arrangement of the distributor 40 and of the cam 41A has the advantage of not in any way impeding maneuvering of the arm to connect it to the tank, and in particular that the segment 24 can be moved to either side of the segment 23 without difficulty.

The fact that the angle between the arm segments 23, 24 then goes from less than to more than 180 degrees or vice versa, in other words through the configuration chosen to indicate untimely moving off of the vehicle, will not trigger the disconnector 28 because the distributor 34 is in the idle position, the arm not being connected to the tank.

One example of a disconnector in accordance with the invention is shown in FIGS. 4 and 5, on a reduced scale as compared with FIG. 1 (the inside diameter of its ends is the same as that of the connector pipe elements 1 and 2). This disconnector comprises two end elements 28A and 2BB each adapted to be welded to a sub-segment of the segment 27 (27A and 27B, respectively; FIGS. 2 and 3) so that the disconnector is just downstream of that loading arm segment 27.

The end element 28A incorporates a valve 42A provided with an axial stem 43A on the side opposite the segment 27A, and including on the side facing towards that segment an axial stem 44A adapted to slide in a guide 45A connected by hydrodynamically profiled ribs to the lateral wall of the element 28A. A spring 46A is disposed around the stem 44A between the guide 45A and the valve 42A which it tends to urge away from the guide. From the latter, on the side opposite the segment 27A, the end element 28A widens to a constant diameter over a certain distance, and then narrows to form a seat against which the valve 42A normally rests (FIG. 5) so that it normally closes the end element 2BA. Beyond the seat the end element returns to the diameter that it had before it widened. In the open position (FIG. 4) the valve 42A is substantially at the center of the enlarged position of the end element 28A, this portion enabling the fluid to flow around the valve 42A with minimum head losses.

The end element 28B includes a portion similar to the portion of the end element 28A that has just been described, the corresponding reference numerals in FIGS. 4 and 5 carrying the suffix B instead of A.

At their free ends the end elements 28A and 28B include, respectively, a bore 47 and a cylinder 48 of similar diameter and substantially at their center, a ring of balls 49 and an annular recess 50. An unlocking sleeve 51, slidable on the outer surface of the end element 28A towards its free end, includes an annular recess 52 and, at its opposite end, a bore of larger diameter, the space between the sleeve 51 and element 28A accommodating a spring 53 which urges the sleeve towards the free end of the element 28A.

To connect the elements 28A and 28B the sleeve 51 must be placed in the unlocking position (shown in FIG. 5) with the recess 52 facing (surrounding) the ring of balls 49, by compressing the spring 53. In this position the balls may be displaced into the groove until they no longer project into the bore 47, whereby the cylinder 48 may be inserted into the bore 47. During this movement the stems 43A, 43B come into end-to-end engagement and cause mutual opening of the valves 42A, 42B. At the end of insertion the recess 50 faces the ring of balls 49 so that the latter may enter it, the spring 53 is then allowed to expand and move the sleeve 51 into the locking position shown in FIG. 4, wherein the balls are no longer able to escape from the recess 50, and the end elements 28A, 28B are in their locked (connected) position.

The unlocking means comprise, in addition to the sleeve 52 and the spring 53, an annular pneumatic actuator including an annular piston 54 fastened to the sleeve 51 and accommodated in an annular cylinder 55 having an inlet orifice 56 located, relative to the piston, on the side opposite to the spring. The piston moves from the position shown in FIG. 4 to that shown in FIG. 5 when compressed air is introduced at sufficient pressure through the port 56, in particular through the safety fluid line 35 the end of which is connected to the port 56. When such movement occurs, the end elements 28A, 28B are released from each other so that in the event of an emergency, such as unanticipated departure of the vehicle to which the arm is connected, the valves 42A, 42B will close in response to the springs 46A, 46B, respectively, to prevent spillage of fluid from either the arm or the tank.

The foregoing movement of the end elements 28A, 28B away from each other breaks the tube 18 so that the connection signal disappears, and this fact may be exploited to instigate additional emergency measures, in particular shutting down of the means feeding the loading arm and starting up of means for draining the latter.

It will be noted that numerous alternative embodiments of the safety disconnector are feasible with regard to the means for blocking the end elements, in particular means to enable disconnection without loss of fluid.

In the foregoing description the arm is fixed and the tank carried by a vehicle, but as an alternative the tank may be fixed and the arm carried by a vehicle, or the arm and the tank may both be carried by a vehicle.

In another embodiment of the invention the fluid line 35 is connected to a source of hydraulic pressure rather than pneumatic pressure, and the distributors 34 and 40 are hydraulic distributors as is the system controlling unlocking of the disconnector 28.

Although the best mode contemplated for carrying out the present invention has been herein shown and described, it will be apparent that modification and variation may be made without departing from what is regarded to be the subject matter of the invention.

What is claimed is:

1. A method for disconnecting an articulate fluid loading arm from a tank, where wither the arm or the tank is carried on a mobile vehicle, in the event of untimely departure of the vehicle, the loading arm including a safety disconnector comprising two pipe elements each containing a valve that is normally closed and that moves into an open condition when the pipe elements are connected together, the method comprising:
   (a) sensing the existence of a connection between the loading arm and the tank;
   (b) sensing the existence of a predetermined configuration of the arm; and
   (c) disconnecting the arm from the tank when the simultaneous existence of said connection and said configuration is sensed.

2. A method according to claim 1 wherein the safety disconnector comprises fluid powered unlocking means (52, 52, 53, 54) connected to a source of fluid pressure by a conduit (35) containing, in series, first and second pressure distributors (34,40), said distributors being closed when inactive, and wherein
   (a) the first distributor (34) is opened when a connection between the loading arm and the tank is sensed, and
   (b) the second distributor (40) is opened when the predetermined configuration of the arm is sensed.

3. A fluid loading arm adapted to be connected to a tank where the arm or the tank is carried by a mobile vehicle, the arm comprising:
   (a) a safety disconnector for disconnecting the arm and the tank in the event of untimely departure of the vehicle, said disconnector comprising two pipe elements each containing a valve that is normally closed and that opens when said pipe elements are placed into connected condition;
   (b) means for sensing a connection between the loading arm and the tank;
   (c) means for sensing a predetermined angular configuration of the loading arm;
   (d) means for unlocking the safety disconnector; and
   (e) means for actuating the unlocking means simultaneously senses said connection and said predetermined configuration.

4. A fluid loading arm according to claim 3 wherein said safety disconnector comprises fluid powered unlocking means (51, 53, 54, 55), and wherein said means for actuating the unlocking means comprises a fluid conduit (35) connected to said unlocking means and adapted to be connected to a source of fluid pressure, and first and second distributors (34, 40) in series in said fluid conduit, said distributors closed when inactive and opening when said means for sensing a connection between the loading arm and the tank and said means for sensing a predetermined configuration of the loading arm simultaneously sense said connection and said predetermined configuration.

5. A fluid loading arm according to claim 3 wherein said means for sensing a connection between the loading arm and the tank comprises two arm pipe elements (1, 2) and a pressure seal (15), one of said arm pipe elements (1) having a passage (16A, 16B) in its wall in communication with an area (11) in contact with the seal when the pipe elements are connected, a sensing conduit (18) connected to said passage (16A, 16B) in the arm pipe element and adapted to be connected to a source of fluid pressure, and a sensor (34) responsive to the pressure in said sensing conduit.

6. A fluid loading arm according to claim 3 wherein said means for sensing a predetermined configuration comprises a plunger (41) and a cam (41A) disposed on an articulation of the arm, the plunger actuated by the cam when the angular configuration of the arm arrives at 180 degrees.

7. A fluid loading arm according to claim 3 wherein said unlocking means for the safety disconnector comprises an unlocking sleeve (51) slidably surrounding the external surface of one of the elements (28A) of the disconnector (28), a spring (53) holding the sleeve in its unlocked position, and an annular fluid piston-and-cylinder actuator (54, 55) surrounding said surface, said actuator comprising a piston (54) fastened to the sleeve and operating in the opposite direction to the spring.

* * * * *